United States Patent
Yi et al.

(10) Patent No.: US 8,406,164 B2
(45) Date of Patent: Mar. 26, 2013

(54) METHOD AND SYSTEM FOR IMPLEMENTING HARD HANDOVERS BETWEEN ACCESS NETWORKS

(75) Inventors: Shunchang Yi, Shenzhen (CN); Hailong Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 329 days.

(21) Appl. No.: 12/676,101

(22) PCT Filed: Oct. 22, 2008

(86) PCT No.: PCT/CN2008/072790
§ 371 (c)(1),
(2), (4) Date: Mar. 2, 2010

(87) PCT Pub. No.: WO2009/056045
PCT Pub. Date: May 7, 2009

(65) Prior Publication Data
US 2010/0202404 A1    Aug. 12, 2010

(30) Foreign Application Priority Data
Oct. 26, 2007 (CN) .......................... 2007 1 0165514

(51) Int. Cl.
*H04B 7/212* (2006.01)
(52) U.S. Cl. ........................ 370/324; 370/508
(58) Field of Classification Search ............... 370/335
See application file for complete search history.

(56) References Cited

U.S. PATENT DOCUMENTS

| | | | |
|---|---|---|---|
| 6,026,301 A * | 2/2000 | Satarasinghe | 455/436 |
| 6,246,673 B1 | 6/2001 | Tiedemann, Jr. | |
| 6,549,545 B1 | 4/2003 | Yamamoto | |
| 6,903,684 B1 * | 6/2005 | Simic et al. | 342/357.29 |
| 6,982,971 B2 | 1/2006 | Tiedemann, Jr. | |
| 2001/0021179 A1 | 9/2001 | Tiedemann, Jr. | |
| 2002/0061749 A1 * | 5/2002 | Hunzinger | 455/436 |
| 2003/0174666 A1 * | 9/2003 | Wallace et al. | 370/324 |
| 2007/0153769 A1 * | 7/2007 | Comstock et al. | 370/352 |

FOREIGN PATENT DOCUMENTS

CN    1235444 A    11/1999
(Continued)

OTHER PUBLICATIONS

International Search Report in international application No. PCT/CN2008/072790, mailed Feb. 5, 2009.
(Continued)

*Primary Examiner* — Sai-Ming Chan
(74) *Attorney, Agent, or Firm* — Oppedahl Patent Law Firm LLC (57) ABSTRACT

A method and a system for implementing hard handovers between access networks are provided, and the method includes: the access network on the target side obtaining the loop round trip delay of the pilot of the access network on the target side, and setting a center of a searching window of the pilot of the access network on the target side according to the obtained loop round trip delay of the pilot of the access network on the target side, so as to carry out the hard handovers between the access network on the source side and the access network on the target side. With the invention, the hard handovers between access networks could be implemented successfully.

5 Claims, 5 Drawing Sheets

FOREIGN PATENT DOCUMENTS

| | | |
|---|---|---|
| CN | 1341339 A | 3/2002 |
| JP | 2002510157 A | 4/2002 |
| JP | 2002538699 A | 11/2002 |
| JP | 2003110493 A | 4/2003 |
| JP | 2003244742 A | 8/2003 |
| JP | 2007522759 A | 8/2007 |
| KR | 1020050012491 A | 2/2005 |
| WO | 2007038358 A2 | 4/2007 |

OTHER PUBLICATIONS

English Translation of the Written Opinion of the International Search Authority in international application No. PCT/CN2008/072790, mailed on Feb. 5, 2009.

A. J. Holcman & E. G Tiedemann: Proceedings of the VTC 1994 IEEE 44th Vehicular Technology Conference, vol. 1, pp. 590-594.

\* cited by examiner

METHOD AND SYSTEM FOR IMPLEMENTING HARD HANDOVERS BETWEEN ACCESS NETWORKS

TECHNICAL FIELD

The present invention relates to the field of communications, especially to a method and a system for implementing hard handovers between access networks.

BACKGROUND

Figure 1:
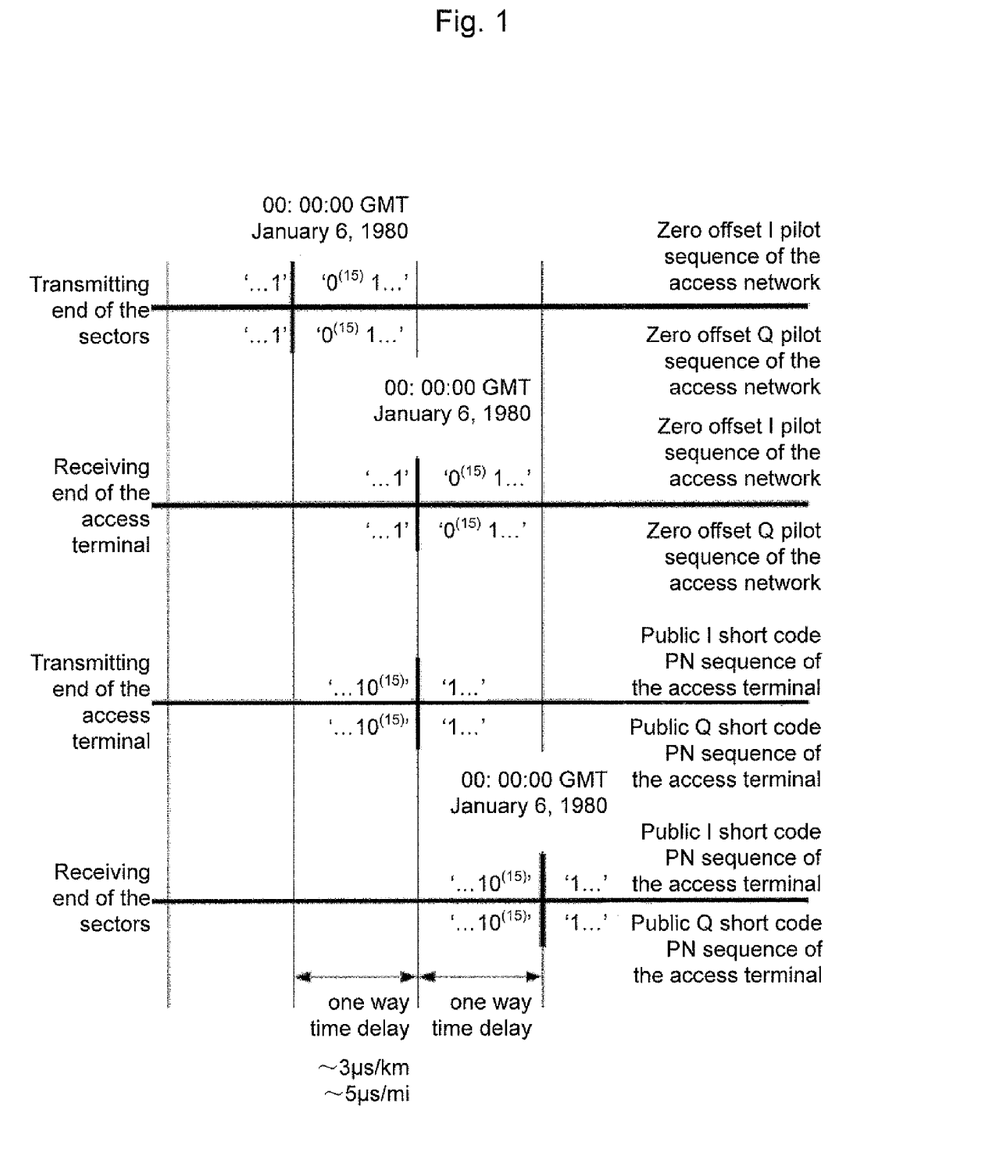
FIG. 1 is a schematic diagram illustrating the system time line of the CDMA system in correlation techniques.

A Code Division Multiple Access (CDMA) system has three system time, i.e. base station sending system time, Access Terminal (AT) receiving system time (coincident with AT sending system time), and base station receiving system time. As shown in FIG. 1, $0^{(n)}$ represents a sequence of continuous zeros, and the time measurements are carried out at the sector antenna and an AT RF connector. There are four erect thick lines in FIG. 1, and from the top to the bottom, the first line represents the base station sending system time, the second line and the third line represent the AT receiving system time, and the fourth line represents the base station receiving system time. The AT receiving system time is delayed relative to the base station sending system time, and the base station receiving system time is also delayed relative to the AT receiving system time.

Suppose that signals of a Base Transceiver Station (BTS) can be propagated rectilinearly to an AT without any consideration of other propagation paths. The base station sending system time is taken from Global Position System (GPS). When the BTS sends a signal A, the time delay for the signal A to arrive the AT is L1/c (wherein, the L1 is the distance from the BTS to the AT, and the c is the velocity of light), and this is the delay reason of the AT receiving system time relative to the base station sending system time. A High Rate Packet Data (HRPD) system regulates that the AT sending system time coincides with the AT receiving system time. The time delay of the base station receiving system time relative to the AT receiving system time is also L1/c.

It can be seen from the above that the time delay of the base station receiving system time relative to the base station sending system time is totally 2×L1/c (In particular, the formula for the multi-aspect soft handover, i.e. multi-legs soft handover, is slightly different, which will be described in detail later). Suppose that the delay of the base station receiving system time relative to the base station sending system time is loop Round Trip Delay (RTD), thus a center of a searching window is created. In other words, a Channel Element (CE) of the BTS needs to defer the base station receiving system time for the RTD relative to the base station sending system time in order to demodulate AT signals correctly. Because the base station sending system time is unified, but the base station receiving system time may change with the positions of the BTS and the AT that communicates with the BTS dynamically, as well as the uncertainty of electric wave propagation in practice, the AT signals can not be necessarily demodulated correctly by the base station receiving system time which is deferred for the RTD. Therefore, the channel element actually searches the AT signals by shaking right-and-left within certain limits with the RTD as the center. When the signals are acquired, they will be locked. The shaking limit from the right to the left is the width of the searching window.

To determine the AT system time at the condition of multi-aspect soft handover: though different BTSs have identical base station sending system time, because the distances from the different BTSs to the same AT are different, the time delays Td of the signal propagation are also different. The protocol C.S0024-A v3.0 of the $3^{rd}$ Generation Partnership Project 2 (3GPP2) stipulates that the smallest Td should be adopted by the AT. In other words, when the multiple BTSs send the same signal A, the BTS that makes the signal A arrive at the AT first (the distance between the BTS and the AT is the shortest) will be adopted by the AT to determine its own system time. The corresponding pilot of BTS is the one that arrives at the AT earlier in the two BTSs in FIG. 2. Hereinafter, suppose that the AT determines its own time by the pilot of the BTS 1.

Figure 2:
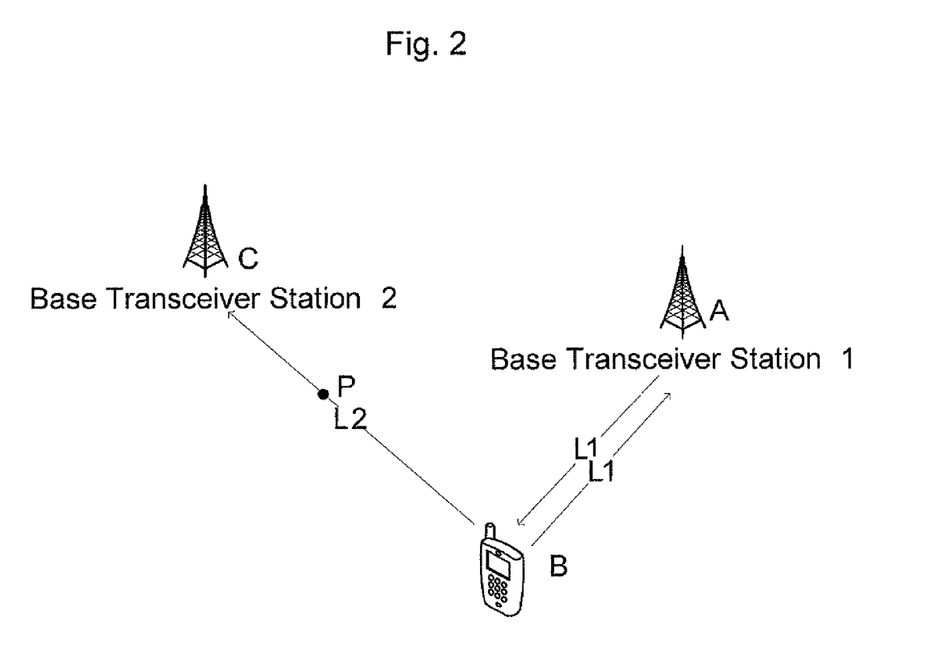
FIG. 2 is a schematic diagram illustrating the position of the BTS and the AT under the condition of multi-aspect soft handover in correlation techniques.

It can be seen from FIG. 2 that the delay time of the AT system time relative to the sending system time of the BTS 1 is L1/c. The receiving system time of the BTS 1 is 2×L1/c, i.e. the RTD of the BTS 1 is 2×L1/c. While the receiving system time of BIS 2 is the sum of the time delay L1/c of the AT system time and the time delay L2/c that is from the AT to the BTS 2, i.e. the RTD of pilot of the BTS 2 equals to L1/c+L2/c.

A Pseudo-Noise (PN) offset is actually the phase of 15-bit short code pseudo-random sequence, the unit of which is 64 CHIP. The PNs of all BTSs in the system are the integral multiples of a parameter called PILOT_INC in the system. For instance, if the PILOT_INC4, then the PN=0, 4, 8, 12, 16 . . . . When the AT finds a new pilot, a Route Update (RU) message is reported, one field of which corresponds to the new pilot: PN_PHASE, the unit of which is CHIP. The meaning of the field is: a phase of the new pilot measured by the AT according to the current AT system time. The PN_PHASE of the new pilot in the RU does not necessarily equal to an integral multiple of PILOT_INC×64. But it is obvious that the PN of the new pilot should be the PN corresponding to the PN_PHASE which is the most close to an integral multiple of PILOT_INC×64. So the PN can be calculated with the formula below, the unit of which is CHIP:

$$PN = \left[\frac{PN\_PHASE + 32 \times PILOT\_INC}{64 \times PILOT\_INC}\right] \times PILOT\_INC \quad (1)$$

In the above formula, all variables take the round-off numbers, and the content within needs to be rounded down.

The calculation of the center of the searching window of the new pilot: as shown in FIG. 2, suppose that the BTS 2 is at Position P, and the distance from point P to the AT is L1, then the pilot phase difference of the BTS 2 and the BTS 1 will be n which is an integral multiple of the PILOT_INC×64 from the view point of the AT. The PN_PHASE of the pilot of the BTS 2 reported by the AT is also an integral multiple of the PILOT_INC×64, i.e. it equals to PN×64 calculated from formula 1. When the BTS 2 is at Position C as shown in FIG. 2, a balance DELTA needs to be added on the basis of n times of the PILOT_INC×64 to be the pilot phase difference of the BTS 2 and the BTS 1 from the view point of the AT. The DELTA is the propagation time of electric wave from Position C to Position P. The value of the DELTA can be calculated with the formula below:

$$\begin{aligned}DELTA &= (L2 - L1)/c \quad (2)\\ &= PN\_PHASE\_C - PN\_PHASE\_P\\ &= PN\_PHASE\_C - PN \times 64\end{aligned}$$

wherein, the PN_PHASE_C and the PN_PHASE_P are the PN_PHASEs within the RU of the BTS 2 at point C and the point P respectively; the PN is the value of the PN calculated according to the formula 1 when the BTS 2 is at the point C. whereas RTD2, which is the center of the searching window of the BTS 2, is:

$$RTD2 = L1/c + L2/c = 2 \times L1/c + (L2 - L1)/c \quad (3)$$
$$= RTD1 + \text{DELTA}$$

wherein the RTD1 is the center of the searching window of the pilot of the BTS 1, which can be obtained after the CE of the BTS 1 acquires the AT. Thus the calculation of the center of the searching window of the pilot of the BTS 2 is finished.

When implementing hard handovers between ANs (Access Networks), the AN on is the source side receives the RU messages reported by the AT, and the CE of the AN on the source side acquires the RTDs of all the PNs in the RU according to the received RU. But because the AN on the target side does not receive the RU message, the RTD of the PN of the AN on the target side cannot be obtained. Thus, the CE of the AN on the target side does not determine its own center of the searching window, and which makes it difficult for the CE of the AN on the target side to acquire the reverse pilot channel of the AT when the AT hands over towards the cell of the AN on the target side.

SUMMARY

Since with the existing technique, when the AT hands over towards the cell of the AN on the target side, it is difficult for the CE of the AN on the target side to acquire the reverse pilot channel, and the hard handovers between access networks can't be carried out, so the present invention is put forward, and therefore, the present invention aims to solve the above-mentioned technical problems by providing a method and a system for implementing hard handovers between access networks.

According to an aspect of the present invention, it provides a method for implementing hard handovers between access networks. The method comprises the following steps: the access network on the target side obtains a loop round trip delay of a pilot of the access network on the target side; the access network on the target side sets a center of a searching window of the pilot of the access network on the target side according to the obtained loop round trip delay of the pilot of the access network on the target side, so as to implement the hard handovers between the access network on the source side and the access network on the target side.

According to another aspect of the present invention, it provides a system for implementing hard handovers at the access network on the target side, which comprises: the first obtaining module, being used to obtain a loop round trip delay of a pilot of the access network on the target side; a setting module, being used to set a center of a searching window of the pilot of the access network on the target side according to the loop round trip delay of the pilot in the first obtaining module; a hard handover module, being used to carry out the hard handovers between the access network on the source side and the access network on the target side according to the center of the searching window of the pilot in the setting module.

The present invention can solve the problem that it is difficult for the CE of the AN on the target side to acquire the reverse pilot channel of the AT during carrying out the hard handovers between ANs, so as to implement the hard handovers between the ANs successfully.

BRIEF DESCRIPTION OF THE DRAWINGS

The described drawings here are used for providing further understanding of the present invention, comprising a part of the application. The schematic embodiments and descriptions are used for describing the present invention, but they do not create unsuitable limitations to the present invention. In the drawings.

DETAILED DESCRIPTION

Summary of the Functions

Aiming at solving the problem that it is difficult for the CE of the AN on the target side to acquire the reverse pilot channel of the AT during the AT hands over to the cell of the AN on the target side in the existing technique, the embodiment of the present invention provides a method for hard handovers between access networks, which sets a center of a searching window of a pilot of the access network on the target side by the access network on the target side according to the obtained the pilot of the access network on the target side, so as to carry out the hard handovers between the access network on a source side and the access network on the target side. Specifically, the access network on the target side can obtain the pilot of the access network on the target side directly from the access network on the source side, and can also calculate the pilot of the access network on the target side with the pilot of the access network on the source side sent by the access network on the source side.

The embodiment of the present invention will be illustrated in detail with reference to the drawings hereinafter. It should be noted that the embodiment and its characteristics of the application can be combined with each other.

The Embodiment of the Method

Figure 3:
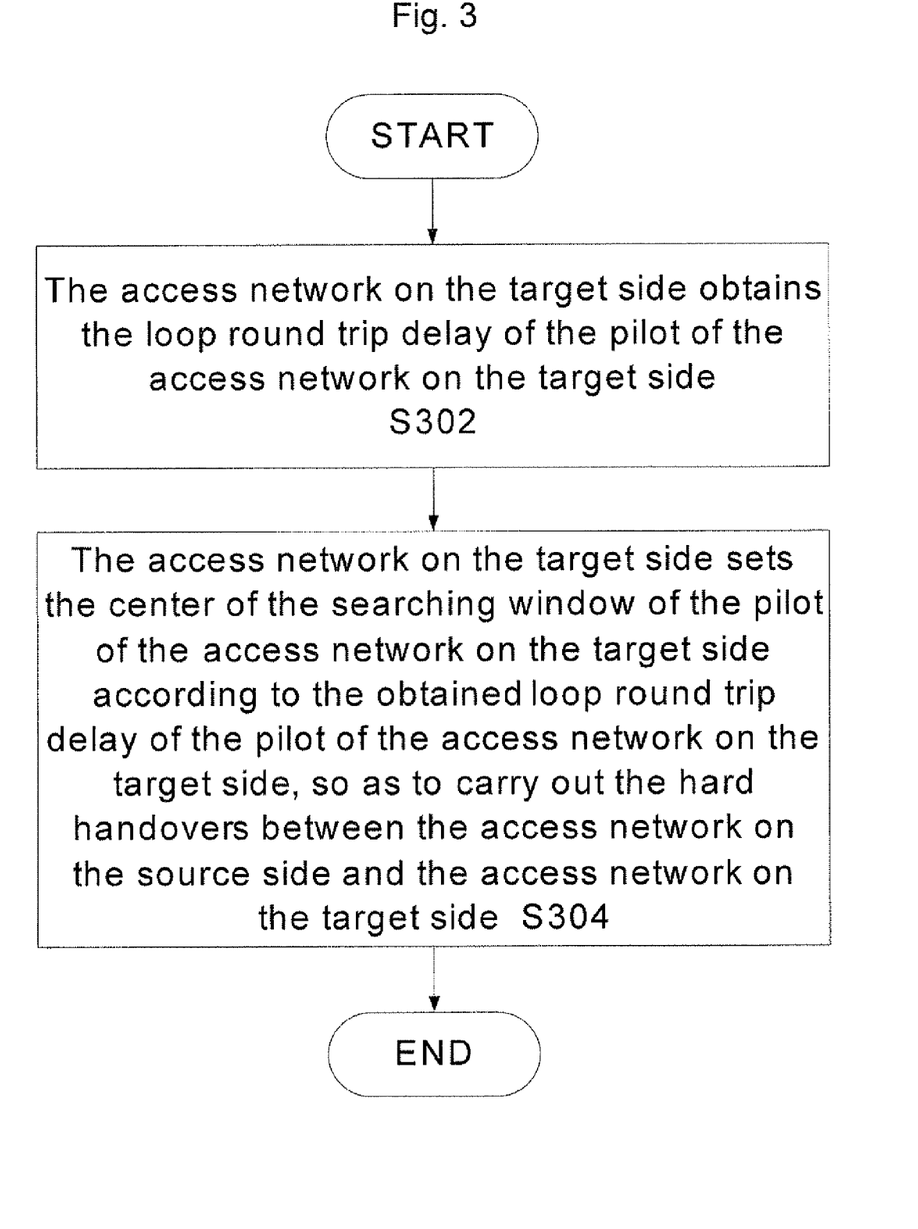
FIG. 3 is a brief flowchart of the method for implementing the hard handovers between access networks according to an embodiment of the present invention.

The implementing method for hard handovers between access networks according to the embodiment of the present invention will be illustrated in brief with reference to FIG. 3. As shown in FIG. 3, the method comprises the following steps:

step S302, the access network on the target side obtains the loop round trip delay of the pilot of the access network on the target side;

Preferably, the access network on the target side may receive the loop round trip delay of the pilot of the access network on the target side from the access network on the source side; the access network on the target side may also receive the loop round trip delay of the pilot of the access network on the source side from the access network on the source side, and may calculate the loop round trip delay of the pilot of the access network on the target side according to the loop round trip delay of the pilot of the access network on the source side.

Step S304, the access network on the target side sets the center of the searching window of the pilot of the access network on the target side according to the obtained to loop round trip delay of the pilot of the access network on the target side, so as to carry out the hard handovers between the access network on the source side and the access network on the target side.

Wherein, the access network on the source side calculates the loop round trip delay of the pilots of all access networks according to the route update messages reported by the access terminal. The access terminal reports the route update messages when it finds a new pilot. The access network on the source side transfers the obtained pilots of the access network on the target side or the loop round trip delay of the pilot of the access network on the source side to the access network on the target side by session transfer request messages.

Figure 4:
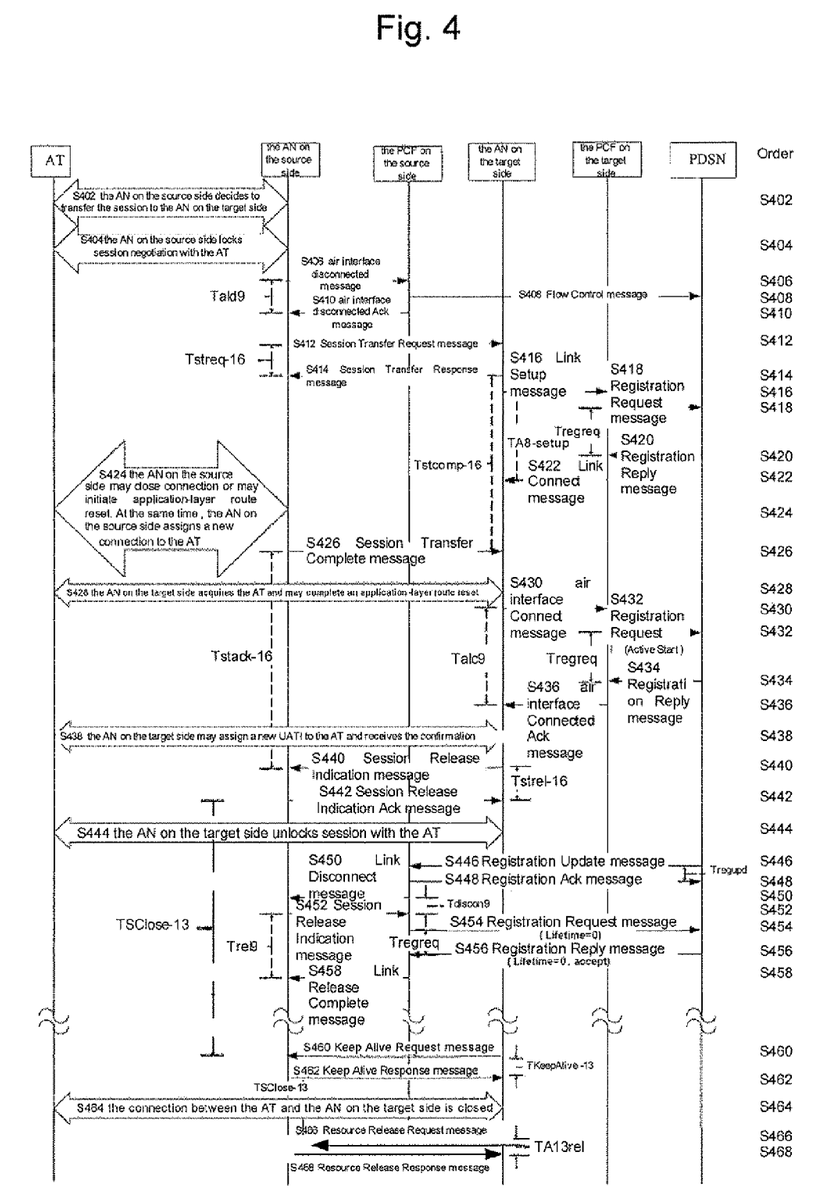
FIG. 4 is a detailed flowchart of the method for implementing the hard handovers between access networks according to an embodiment of the present invention.

The implementing method for hard handovers between access networks according to the embodiment of the present invention will be illustrated in detail with reference to FIG. 4. As shown in FIG. 4, after receiving the RU reported by the AT, the AN on the source side calculates the RTDs of all the pilots included in the RU. When the AN on the source side decides that it is necessary to carry out the hard handovers between ANs, it will transfer the RTD of the pilot of the AN on the target side or the RTD of the pilot of the AN on the source side to the AN on the target side in the session transfer request message (A16-session transfer Request message) in step S412. Then the CE of the AN on the target side sets its own center of the searching window according to the received RTD information of the pilot of the AN on the target side, or sets its own center of the searching window according to the RTD of the pilot of the AN on the target side calculated with the RTD of the pilot of the AN on the source side, so as to acquire the reverse pilot channel of the AT. Specifically, as shown in FIG. 4, the method includes the following steps:

S402, after the handover decision, the AN on the source side decides to carry out the hard handovers between ANs, and transfers the session information to the AN on the target side;

S404, the AN on the source side locks the session negotiation between itself and the AT, so the new session negotiation or the properties updating can not be implemented during the locking period of the session negotiation;

S406-S410, the AN on the source side may send an air interface disconnected message (A9-AL Disconnected message) to inform the Packet Control Function Entity (PCF) on the source side that the air interface is disconnected and stops transferring the data. After receiving the message, the PCF on the source side sends an acknowledge (Ack) message to the AN on the source side, and sends a flow control message (Xoff message) to a Packet Data Service Node (PDSN) to inform the PDSN of stopping sending data to itself. Timer Tald9 controls the time that is from the AN on the source side sending A9-AL Disconnected message to receiving of the Ack message;

S412, the AN on the source side sends a session transfer request message (A16-session transfer request message) to the AN on the target side to request the transmission of the session information. The message will include the condition information of the current session, the lately received service channel report message, and other information needed in the hard handovers between ANs. The information needed in the hard handovers between ANs, includes the RTD of the pilot of the AN on the target side or the RTD of the pilot the AN on the source side. The CE of the AN on the target side will set its own center of the searching window according to the received RTD information of the pilot. Optionally, it will set its own center of the searching window according to the RTD of the pilot of the AN on the target side calculated by the received RTD of the pilot of the AN on the source side, so as to acquire the reverse pilot channel of the AT. the AN on the source side also starts Timer Tstreq-16.

The following process description is on the basis of assuming that the AN on the target side receives the hard handover request.

S414, the AN on the target side receives the A16-Session Transfer Request message. According to a sector list of the AN on the target side in the lately received service channel report message packaged in the A16-Session Transfer Request message, the sectors on which to establish new connections with the AT are decided, and the resources are allocated on these sectors in advance. Then the AN on the target side sends a session transfer response message (A16-Session Transfer Response message) to the AN on the source side to indicate receiving the hard handover request. the AN on the target side starts Timer Tstcomp-16. After receiving the A16-Session Transfer Response message, the AN on the source side stops Timer Tstreq-16.

The process from step S416 to step S422 can take place at any time among step S412 and step S446.

S416, the AN on the target side sends a link setup message (A9-Setup-A8 message) to the PCF on the target side, requesting the PCF on the target side to set up Link A8. the AN on the target side starts Timer TA8-setup.

S418, the PCF on the target side detects that the current AT doesn't have is effective Link A10, and then sends a registration request message (A11-Registration Request message) to the PDSN in order to set up Link A10. The PCF on the target side starts Timer Tregreq.

S420, the PDSN will testify the effectiveness of the A11-Registration Request, and feed back a registration reply message (A11-Registration Reply message) in order to receive the request of setting up Link A10. The PCF on the target side will stop Timer Tregreq.

S422, the PCF on the target side sends a link connect message (A9-Connect-A8 message) to the AN on the target side. After the AN on the target side receives the message, Timer TA8-setup is stopped.

S424, the AN on the source side may close the connection or reset a route of an application layer. Meanwhile, the AN on the source side assigns new connections to the AT, requesting the AT to switch to the AN on the target side. This step may take place at any time after step S414. The AN on the source side can repeat this step to increase the probability of the AT receiving the message.

S426, the AN on the source side sends a session transfer complete message (A16-Session Transfer Complete message) to the AN on the target side. If some session condition information is changed after sending the A16-SessionTransfer Request message, the message should inform the AN on the target side of these changes. After the AN on the target side receives the A16-Session Transfer Complete message, Timer Tstcomp-16 will be stopped.

S428, the AN on the target side acquires the AT. If the route of the application layer has been reset, then the reset of the route is finished. After this step, the AN on the target side may begin to send data to the AT.

S430, after the AN on the target side acquires the AT, if the Handoff Type field of the A9-Setup-A8 message in step S416 is set to be 1, then the AN on the target side will send an air interface connected message (A9-AL Connected message) to the PCF on the target side and start Timer Talc9.

S432, after receiving the A9-Setup-A8 message, the PCF on the target side sends the registration request message (A11-Registration Request message) to the PDSN, and the message informs that the PDSN air interface has been set up. The PDSN will start Timer Tregreq.

S434, after receiving the A11-Registration Request message, the PDSN sends the registration reply message (A11-Registration Reply message) to the PCF on the target side. The PCF on the target side will start Timer Tregreq.

S436, after receiving the A11-Registration Request message, the PCF on the target side sends an air interface connected Ack message (A9-AL Connected Ack message) to the AN on the target side in response to the A9-AL Connected message. The PCF on the target side will stop Timer Talc9.

S438, if the AN on the source side and the AN on the target side are in different subnets, the AN on the target side allocates a new Unicast Access Terminal Identification (UATI) to the AT, and receives the confirmation that AT has been using the new UATI.

S440, after the AN on the target side acquires the AT, the AN on the target side sends a session release indication message (A16-Session Release Indication message) to the AN on the source side, requesting the AN on the source side to stop the connection with the PDSN and to clear the session. the AN on the target side starts Timer Tstrel-16. After the AN on the source side receives the message, Timer Tstack-16 is stopped.

S442, the AN on the source side sends a session release indication Ack message) A16-Session Release Indication Ack message) to the AN on the target side. After the AN on the target side receives the message, Timer Tstrel-16 is stopped.

S444, if the AN on the source side doesn't close the connection in step S424, the AN on the target side unlocks the direct session negotiation with the AT. Hereafter, the new session negotiation or the properties updating can be carried out.

Step S446 can take place at any time after step S420.

S446, the PDSN sends a registration updating message (A11-Registration Update message) to the PCF on the source side to lock the Link A10, and starts Timer Tregupd.

S448, the PCF on the source side sends a registration acknowledge message (A11-Registration Acknowledge message) in response to the A11-Registration Update message. The PDSN stops Timer Tregupd after receiving the message.

S450, the PCF on the source side sends a link disconnect message (A9-Disconnect-A8 message) to the AN on the source side, and starts Timer Tdiscon9.

S452, after receiving the session release indication message (A16-Session Release Indication message) and the link disconnect message (A9-Disconnect-A8 message), the AN on the source side sends a link release message (A9-Release-A8 message) to the PCF on the source side, and starts Timer Trel9. After receiving the A9-Release-A8 message, the PCF on the source side stops Timer Tdiscon9.

S454, the PCF on the source side sends a registration request message (A11-Registration Request message) to the PDSN, and requests the PDSN to close Link A10, and starts Timer Tregreq.

S456, the PDSN sends the registration reply message (A11-Registration Reply message) response, and finishes the operation of releasing Link A10. After receiving the message, the PCF on the source side stops Timer Tregreq.

S458, the PCF on the source side sends a link release complete message (A9-Release-A8 Complete message) in response to the AN on the source side. After receiving the message, the AN on the source side stops Timer Trel9.

S460, before the TSClose-13 of the AN on the source side is timeout, the AN on the target side may send a keep alive request message (A13-Keep Alive Request message) to the AN on the source side (Suppose the AN on the source side is the one that allocates the LCM_UATI (long code mask UATI)), and may start Timer TKeepAlive-13.

S462, after receiving the A13-Keep Alive Request message, the AN on the source side restarts Timer TSClose-13, and sends a keep alive response message (A13-Keep Alive Response message) to the AN on the target side. The AN on the target side stops Timer TKeepAlive-13.

S464, the connection between the AT and the AN on the target side is closed.

S466, after closing the direct connection between the AT and the AN on the target side, the AN on the target side sends a resource release request message (A13-Resource Release Request message) to the AN on the source side, so as to release the resources allocated by the AN on the source side. After receiving the message, the AN on the source side stops Timer TSClose-13.

S468, after receiving the A13-Resource Release Request message, the AN on the source side sends a resource release response message (A13-Resource Release Response message) to the AN on the target side. the AN on the source side may reallocate the UATI allocated originally to the AT that takes part in the present handover to other ATs. After receiving the A13-Resource Release Response message, the AN on the target side stops Timer TA13rel.

The step S402 to step S468 presented above can be executed in a group of computer systems such as the instruction executable computers. Though the logic orders are shown in FIG. 4, the steps presented or described can be executed in different orders under some conditions.

The present invention can solve the problem that it is difficult for the CE of the AN on the target side to acquire the reverse pilot channel of the AT during carrying out the hard handovers between ANs, so as to implement the hard handovers between the ANs successfully.

Device Embodiment

Figure 5:
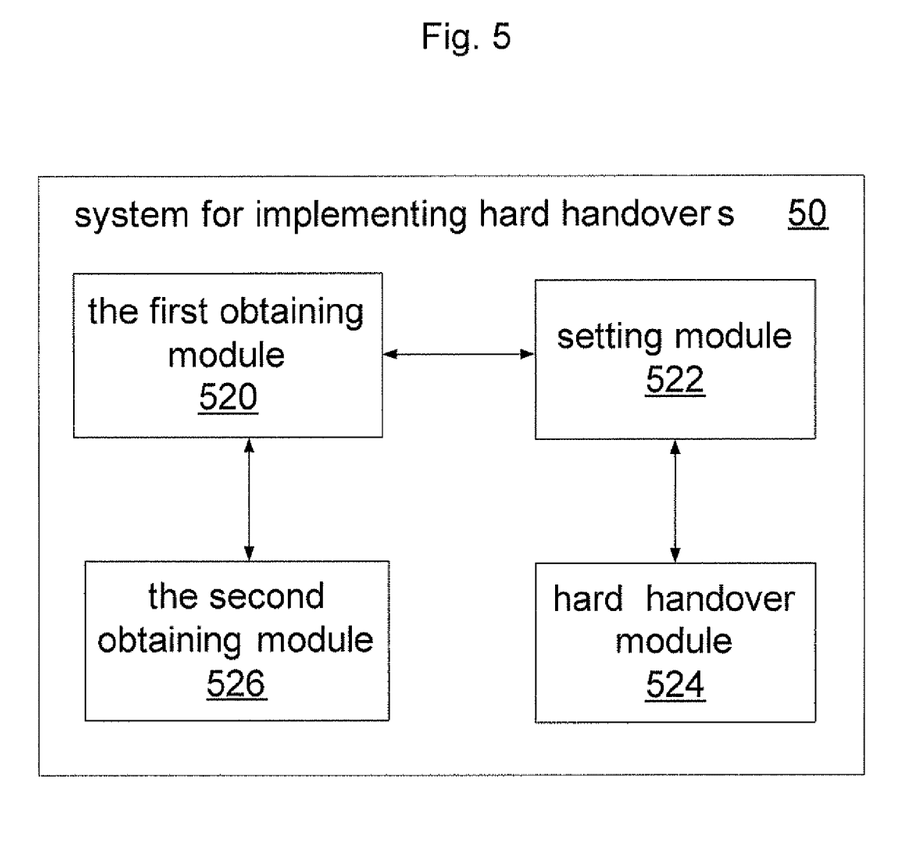
FIG. 5 is a block diagram of the system for implementing hard handovers according to a device embodiment of the present invention.

Another embodiment according to the present invention provides a system for implementing hard handovers, which is used for implementing the method mentioned above. FIG. 5 is a block diagram of the system for implementing hard handovers according to an embodiment of the present invention. Detailed illustrations will be carried out with reference to FIG. 5. As shown in FIG. 5, the system 50 is on the access network on the target side, which includes: the first obtaining module 520, a setting module 522, and a hard handover module 524.

The first obtaining module 520 is used to obtain a loop round trip delay of a pilot of the access network on the target side.

The setting module 522 connected to the first obtaining module 520 is used to set the center of the searching window of the pilot of the access network on the target side according to the loop round trip delay of the pilot in the first obtaining module 520.

The hard handover module 524 connected to the setting module 522 is used to implement the hard handovers between the access network on the source side and the access network on the target side according to the center of the searching window of the pilot in the setting module 522.

Preferably, the system for implementing hard handovers 50 can also include the second obtaining module 526 which is connected with the first obtaining module 520, and the second obtaining module 526 is used to obtain the loop round trip delay of the pilot of the access network on the source side from the access network on the source side.

The first obtaining module 520 may obtain the loop round trip delay of the pilot of the access network on the target side through the loop round trip delay of the pilot of the access network on the source side obtained by the second obtaining module 526, and it may also obtain the loop round trip delay of the pilot of the access network on the target side through the access network on the source side.

The specific processes of implementing the hard handovers have been illustrated in detail in the above-mentioned method embodiment, and will not be repeated here.

It is obvious that those technicians skilled in the art should know that every above mentioned module or step of the present invention can be carried out by general computing devices, which can be assembled on a single computing device or distributed on a network composed of multiple of computing devices. Optionally, they may be carried out by the executable program codes of computing devices, thus they may be saved in memory devices and executed by computing devices, or be made as each integrated circuit module respectively, or be made as a single integrated circuit module with their multiple of modules or steps. Thus the present invention is not limited to any special combination of hardware or software.

The above discussions are only the embodiments of the present invention. The invention should not be construed as limited to the embodiments illustrated above. The present invention can have all kinds of modifications and changes for those skilled in the art. Any modifications, substitute or improvements without departing from the spirit and principles of the present invention are deemed to be included in the scope of the present invention, as defined by the claims.

What is claimed is:

1. A method for implementing hard handovers between access networks, comprising:
   the access network on a target side obtaining a loop round trip delay of a pilot of the access network on the target side; and
   the access network on the target side setting a center of a searching window of the pilot of the access network on the target side according to the obtained loop round trip delay of the pilot of the access network on the target side, so as to implement the hard handovers between the access network on a source side and the access network on the target side,
   wherein, the access network on the target side obtaining the loop round trip delay of the pilot of the access network on the target side comprises:
   the access network on the target side receives the loop round trip delay of the pilot of the access network on the target side from the access network on the source side; or
   the access network on the target side receives the loop round trip delay of the pilot of the access network on the source side from the access network on the source side, and calculates the loop round trip delay of the pilot of the access network on the target side according to the loop round trip delay of the pilot of the access network on the source side.

2. The method according to claim 1, wherein, before the access network on the target side obtains the loop round trip delay of the pilot of the access network on the target side, the method further comprises:
   the access network on the source side obtaining the loop round trip delay of the pilot of all the access networks according to the route update message reported by an access terminal; and
   when the hard handovers between the access networks is in demand, the access network on the source side transferring the obtained loop round trip delay of the pilot of the access network on the target side or the loop round trip delay of the pilot of the access network on the source side to the access network on the target side.

3. The method according to claim 2, wherein, the access terminal reports the route update message to the access network on the source side when it finds a new pilot.

4. The method according to claim 2, wherein, the access network on the source side transfers the loop round trip delay of the pilot of the access network on the target side or the loop round trip delay of the pilot of the access network on the source side to the access network on the target side through session transfer request messages.

5. A system for implementing hard handovers, located in an access network on a target side, comprising:
   a first obtaining module, being used to obtain a loop round trip delay of a pilot of the access network on the target side;
   a setting module, being used to set a center of a searching window of the pilot of the access network on the target side according to the loop round trip delay of the pilot of the access network on the target side obtained by the first obtaining module;
   a hard handover module, being used to carry out the hard handovers between the access network on the source side and the access network on the target side according to the center of the searching window set by the setting module; and
   a second obtaining module, which is used to obtain the loop round trip delay of the pilot of the access network on the source side from the access network on the source side;
   wherein the first obtaining module is used to obtain the loop round trip delay of the pilot of the access network on the target side by the loop round trip delay of the pilot of the access network on the source side obtained by the second obtaining module, or to obtain the loop round trip delay of the pilot of the access network on the target side from the access network on the source side.

* * * * *